(12) United States Patent  
Bruggeman

(10) Patent No.: US 7,495,667 B2
(45) Date of Patent: Feb. 24, 2009

(54) POST PRODUCTION INTEGRATION PLATFORM

(76) Inventor: Michael Bruggeman, 3/11 Nordau St., Ramat Gan (IL) 52464

( * ) Notice: Subject to any disclaimer, the term of this patent is extended or adjusted under 35 U.S.C. 154(b) by 270 days.

(21) Appl. No.: 11/362,397

(22) Filed: Feb. 24, 2006

(65) Prior Publication Data

US 2007/0200853 A1     Aug. 30, 2007

(51) Int. Cl.
G06T 13/00 (2006.01)
G06T 15/70 (2006.01)
G06F 17/00 (2006.01)
G06F 17/20 (2006.01)
G06F 17/21 (2006.01)

(52) U.S. Cl. ........................ 345/473; 715/202
(58) Field of Classification Search ................ 345/473; 715/500.1, 202
See application file for complete search history.

(56) References Cited

U.S. PATENT DOCUMENTS

| | | | | |
|---|---|---|---|---|
| 6,154,600 | A * | 11/2000 | Newman et al. | 386/4 |
| 6,188,396 | B1 * | 2/2001 | Boezeman et al. | 715/500.1 |
| 6,204,840 | B1 * | 3/2001 | Petelycky et al. | 715/500.1 |
| 6,544,293 | B1 * | 4/2003 | Ohanian | 715/500.1 |
| 6,557,042 | B1 * | 4/2003 | He et al. | 709/231 |
| 6,622,171 | B2 * | 9/2003 | Gupta et al. | 709/231 |
| 6,771,285 | B1 * | 8/2004 | McGrath et al. | 715/723 |
| 6,985,966 | B1 * | 1/2006 | Gupta et al. | 709/248 |
| 7,076,535 | B2 * | 7/2006 | Gupta et al. | 709/219 |
| 7,088,774 | B1 * | 8/2006 | Moni et al. | 375/240.16 |
| 7,096,271 | B1 * | 8/2006 | Omoigui et al. | 709/231 |
| 7,149,359 | B1 * | 12/2006 | Omoigui | 382/219 |

* cited by examiner

Primary Examiner—Jin-Cheng Wang
(74) Attorney, Agent, or Firm—Martin Fleit; Paul D. Bianco; Fleit Gibbons Gutman Bongini & Bianco PL

(57) ABSTRACT

Disclosed is a computer software application which integrates video, animation and sound file formats into a unified work environment. The proposed invention includes a unified timeline and a unified visual manipulation environment. By combining these formats into a unified and native format environment the user is able to change and manipulate the video, animation and sound files in relation to one another in a single environment, in their native format and in a non destructive manner. The media inputs are first presented to the user in a single timeline which is a simultaneous visual representation of the files being worked on. The software application also includes an environment which is designed to add a visual set of tools enabling the user to visually manipulate the files represented in the timeline. The operation of the disclosed software application may be described as a universal plug.

18 Claims, 8 Drawing Sheets

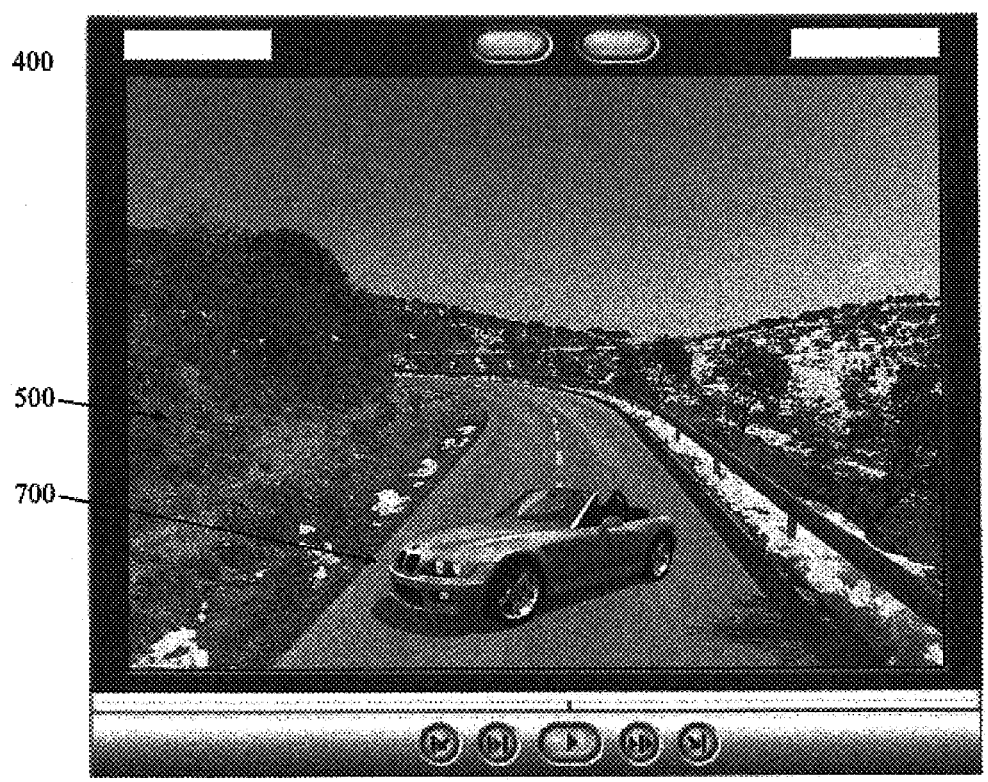

POST PRODUCTION INTEGRATION PLATFORM

FIELD OF THE INVENTION

The present invention relates in general to the field of post production animation, sound and video editing tools, more particularly it relates to a post production integration platform for animation, sound and video.

BACKGROUND

In today's filmmaking world extensive and costly efforts are made to produce film sequences that integrate video clips with three-dimensional animation and sound. Weaving video and three-dimensional animation together is a lengthy and cumbersome task involving many stages and re-do's. These re-do's are required to smoothly match the three-dimensional animation to the video sequences in order to create the illusion that the three-dimensional animation is 'real', and was actually filmed with the original video sequence. Before filming commences, the area and objects to be filmed are measured to calculate their size and relative position. This information is plotted into an animation program, and an animated version of the scene to be filmed is constructed using an alpha channel in the background. The alpha channel creates a background transparency layer, so that the animated sequence can be placed on an additional layer to the filmed material of the same shot. Once the animated and filmed sequences are matched together, the three-dimensional animated sequence is exported as a sequence in Joint Photographic Experts Group (jpeg) format. This in effect converts the three-dimensional animation sequence into an irreversible two-dimensional format that is used in a video-editing suite. Where sequences do not match, the differences are noted and the animator returns to the originally constructed sequence and the long task of matching the animation to the film clip begins again. Sometimes this is done without achieving optimal results, because of minor discrepancies in any of the filmed or three-dimensional animated segments, or due to financial restrictions of going over budget. Often budget restrictions determine the quality of the final output by limiting the amount of tweaking, remakes, and re-dos.

All this makes the post-production process very expensive. In addition, owing to the nature of the process the quality and success of the movie or clip cannot be assessed until the final output form has been produced, that is until the movie or clip is finished. This means that in all instances, sections of work must be repeated to attain the desired outcome. This further increases the costs involved in producing movies or clips that use sound, video and three-dimensional animation together as one.

The techniques used to produce and record sound, video, and animation were developed at separate points in time over the last century. The result being that they each have unique means of production and independent output formats—each format being incompatible with the other. The inclusion of all three media elements in a single output media demands that a series of post production professionals undertake complicated and time consuming techniques and processes. As a result the quality and success of the movie or clip cannot be assessed until the final output form has been produced, i.e. until the movie or clip is finished. It is very rare that an acceptable movie sequence or clip is produced after the first attempt at rendering. In almost all cases, sections of work must be redone to attain the desired outcome. Such repetition increases the costs involved in producing movies or clips that use sound video and animation together.

In broad technical terms these limitations arise since the video is a linear frame-based format, within which time is limited to a set frame rate, and object size is fixed within a video sequence. On the other hand, animation is a vector algorithm within which time is a relative quantity, and object size is not fixed. Objects within animation sequences can be enlarged or reduced in size, sped up or slowed down without restriction. As animation has become an integral part of the film making process there is a need to fuse video and three-dimensional animated sequences within two-dimensional film shots despite the inherent conflicts between the nature of two-dimensional Video and three-dimensional Animation. The use of video editing suites in conjunction with animation and sound programs, while taking into account all of their different formats, transfer protocols, and limitations, has become a complicated process, that often detracts from the goal of making a movie.

There is therefore a need for a solution to the above-mentioned problems. Current day solutions are based on bundling a collection of tools together—each tool providing a partial answer to the problem. Editors and post production engineers must still struggle with a series of processes and tools in order to work. Thus the need for a single platform for seamlessly integrating video, animation and sound still remains. Preferably, such a solution should consider the movie making process from the point of view of the director of the movie.

SUMMARY

Disclosed is a software application which integrates video, animation and sound file formats into a unified environment for performing manipulations on these files. The application, which provides a unified visual manipulation working environment, includes an import module for receiving different media formats, a unified timeline module for combining all files in synchronization to be played on a single timeline, and a processing module enabling the manipulation of each media type separately and in unison in association with other media types in a non destructive manner retaining its original source format characteristics. The software application also includes a captured input window which includes a viewing screen and an input format-configuration panel and controls.

The manipulation the disclosed software allows enables full retention and control of all variable parameters for each source format, and adjusting the sound, video, video-animation and animation parameters by opening the relevant file on the timeline from within its framework constraints. The synchronization between animation and video sequences is achieved by placing the animation timeline control within the video timeline control. The video timeline control places a set of limitations on the animated objects which restrict the size of the animated objects and their time characteristics in accordance with said video sequence.

The software application also includes a Visual Three-Dimensional Integration Interface which enables displaying imported visual content in a three-dimensional environment. The three-dimensional environment enables the integration and manipulation of the timeline content and previewing the output in a two-dimensional form. The Visual Three-Dimensional Integration Interface includes a video surface layer, an animation view platform and a consolidation layer. The animation view platform is constituted at the space between the Consolidation layer and the video surface, wherein the frames of consolidation layer and the video surface layer are locked together and are manipulated via a scale control that can either increase or decrease the size of the two objects and change their relative positioning. The consolidation layer provides two-dimensional video output enabling manipulation, visualization and assessment of the objects to be viewed and judged, thus requiring rendering only before final output is achieved.

The disclosed software application also includes a resolution control module which limits the video preview output by utilizing an adjustable dynamic control that increases or decreases the video resolution and the frames per second displayed while working in the three-dimensional mode. A shade control module enables defining the amount of detail used in presenting the animated object while working in the three-dimensional mode. The import module of the software application includes the step of converting each media format into a native format Also disclosed is a method for integrating video, animation and sound file formats into a unified environment for performing manipulations on the files. The method provides a unified visual manipulation working environment. The creation of the environment includes the steps of importing different media formats, combining all files in synchronization to be played on a single unified timeline; and processing and manipulating each media type separately in association with other media types in a non destructive manner retaining its original source format characteristics and preferences.

The manipulation enables full retention and control of all variable parameters for each source format, and adjusting the sound, video, video-animation and animation parameters by opening the relevant file on said timeline from within its framework constraints.

BRIEF DESCRIPTION OF THE DRAWINGS

These and further features and advantages of the invention will become more clearly understood in the light of the ensuing description of a preferred embodiment thereof, given by way of example, with reference to the accompanying drawings, wherein—

FIG. 7 is an illustration of an example for the resulting two-dimensional image on the consolidation frame according to a preferred embodiment of the present invention;

DETAILED DESCRIPTION OF THE PREFERRED EMBODIMENTS

The present invention discloses an innovative solution to the above-mentioned shortcomings of prior art. The preferred embodiment of the present invention is a computer software application which integrates video, animation and sound file formats into a unified work environment. The proposed software application includes a unified timeline and a unified visual manipulation environment. By combining these formats into a unified and native format environment the user is able to change and manipulate the video, animation and sound files in relation to one another in a single environment, in their native format and in a non destructive manner. This is done by first combining the media inputs into a single timeline so that the user can see a visual representation of the files being worked on simultaneously. The software application also includes an environment which is designed to add a visual set of tools enabling the user to visually manipulate the files represented in the timeline. The operation of the disclosed software application may be described as a universal plug for linking and manipulating video, animation and sound applications within a single non destructive and native work environment.

Figure 1:
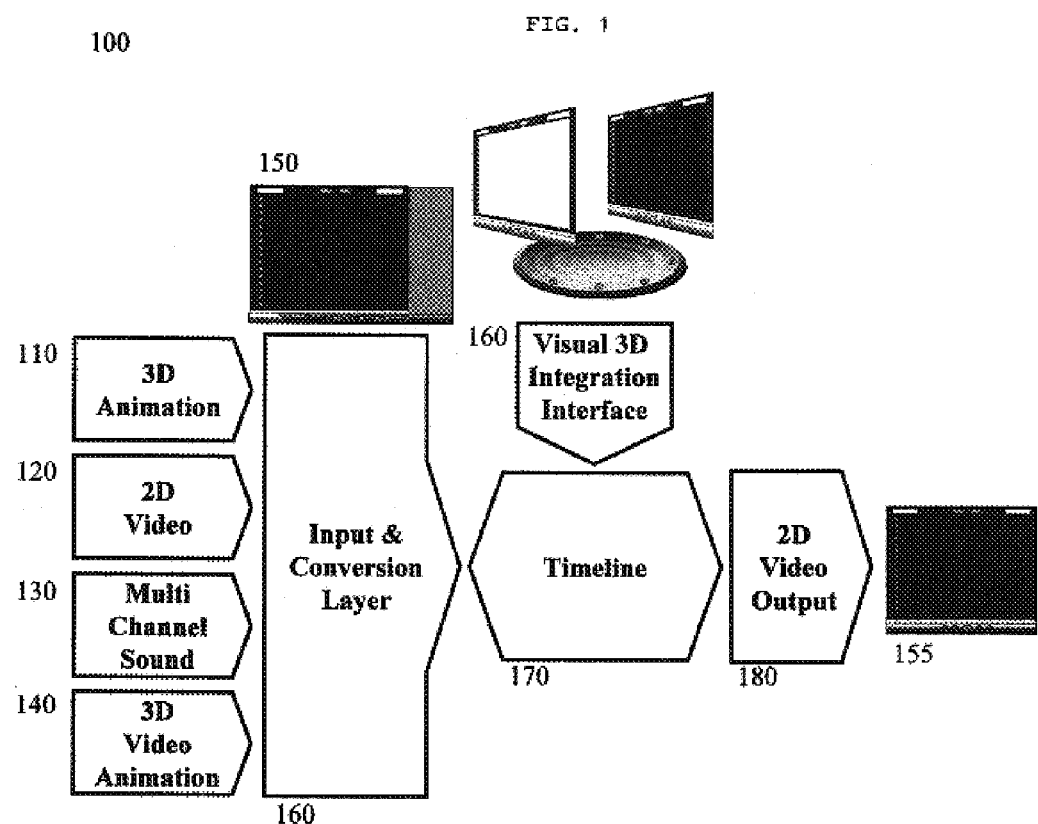
FIG. 1 is a block diagram illustrating the components comprising the preferred embodiment of the present invention.

FIG. 1 is a block diagram illustrating the principal components comprising the present invention and their relations, according to the preferred embodiment. First, software application 100 includes a universal file import 110-140, which allows it to import all related formats whether it be sound, video or animation files into one project bin within application 100, without having to first render, convert, or align media format types. As illustrated, there are four input channels for the media types of software application 100: three-dimensional animation 110, two-dimensional video 120, multi-channel sound 130 and three-dimensional video animation 140. Through the input channels 110-140 the video, animation, sound and video-animation files of the project are imported in native format. For instance, application 100 may read native video editing files, of any video editing application, through video input channel 120. Each format type retains its original source format characteristics. This enables full retention, control and manipulation of all variable parameters for each source format. Input media channels 110-140 are connected to the Input and Conversion Layer 160. Input and Conversion Layer 160 converts the file format of the imported files to the unified format. The format conversion performed by Input and Conversion Layer 160 retains the preferences of imported data as they were set by the creators of the files. After importing the files the global preferences of the imported materials can be set. All variable parameters of the project configuration as well as the input and output preferences can be aligned to conform to the limitations placed on the project, or they can be based on the preferences already set by one of the imported files.

Figure 2:
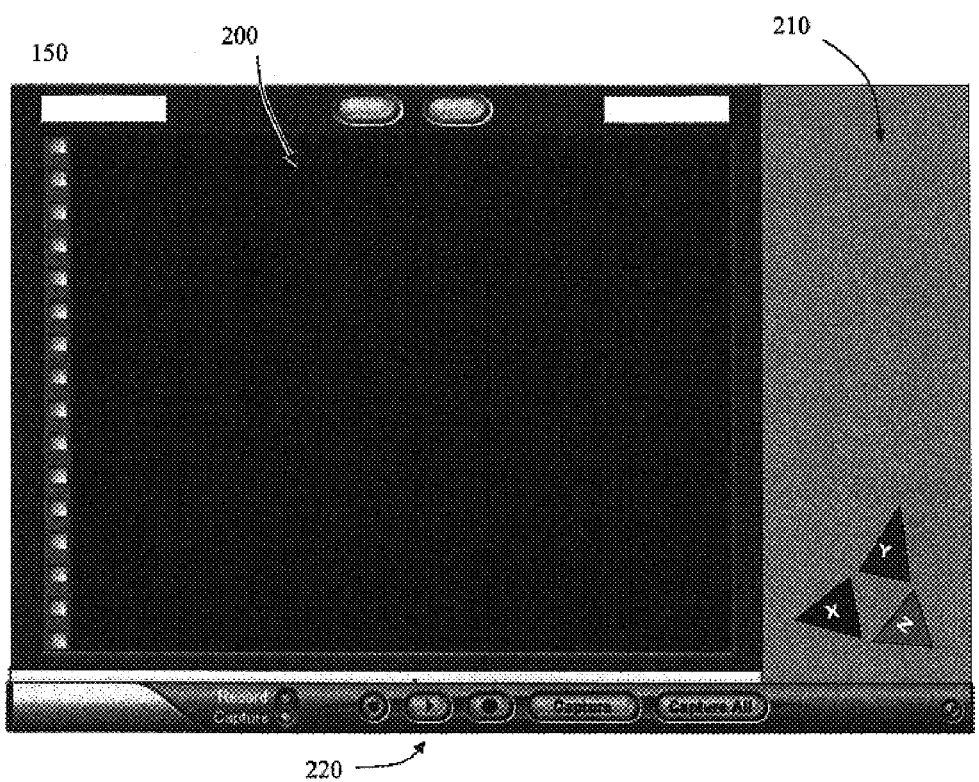
FIG. 2 is an illustration of the captured input window according to the preferred embodiments of the present invention.

The imported files may be viewed on the captured input window 150. Captured input window 150 is illustrated in greater detail in FIG. 2. Captured input window 150 is comprised of viewing screen 200, input format configuration panel 210 and controls 220. Format configuration panel 210 is a pull-down menu for the format selection and a check box for the input selection. Using controls 220, new data may be captured and captured data may be displayed.

Figure 3:
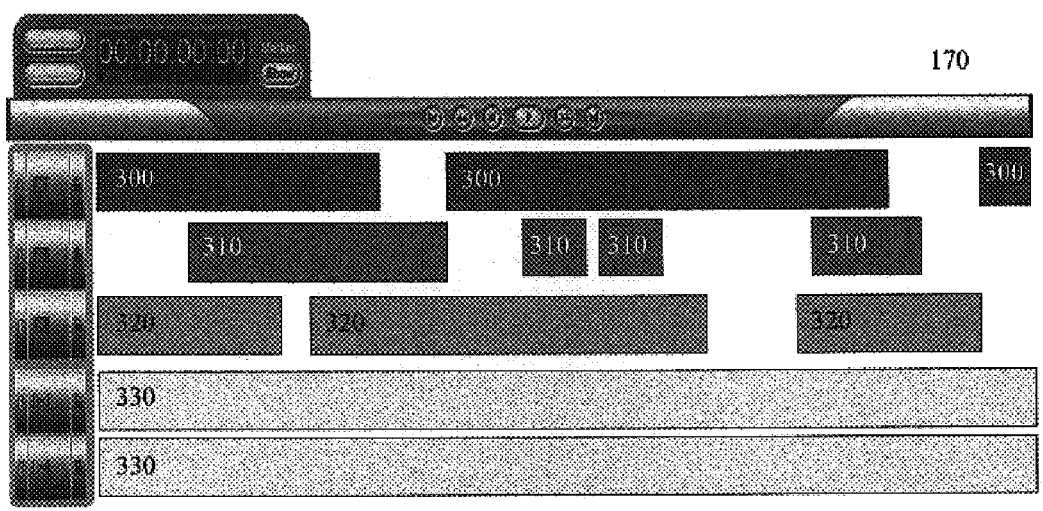
FIG. 3 is an illustration of the unified timeline according to the preferred embodiment of the present invention.

All imported and converted files are then visually represented in timeline 170 of application 100. Timeline 170 is illustrated in FIG. 3. Single timeline 170 allows the user to manipulate the sound 330, video 300, video-animation 310 and animation 320 parameters by simply opening the relevant file on timeline 170 from within its framework constraints and tweaking it until the desired results are achieved.

Figure 4:
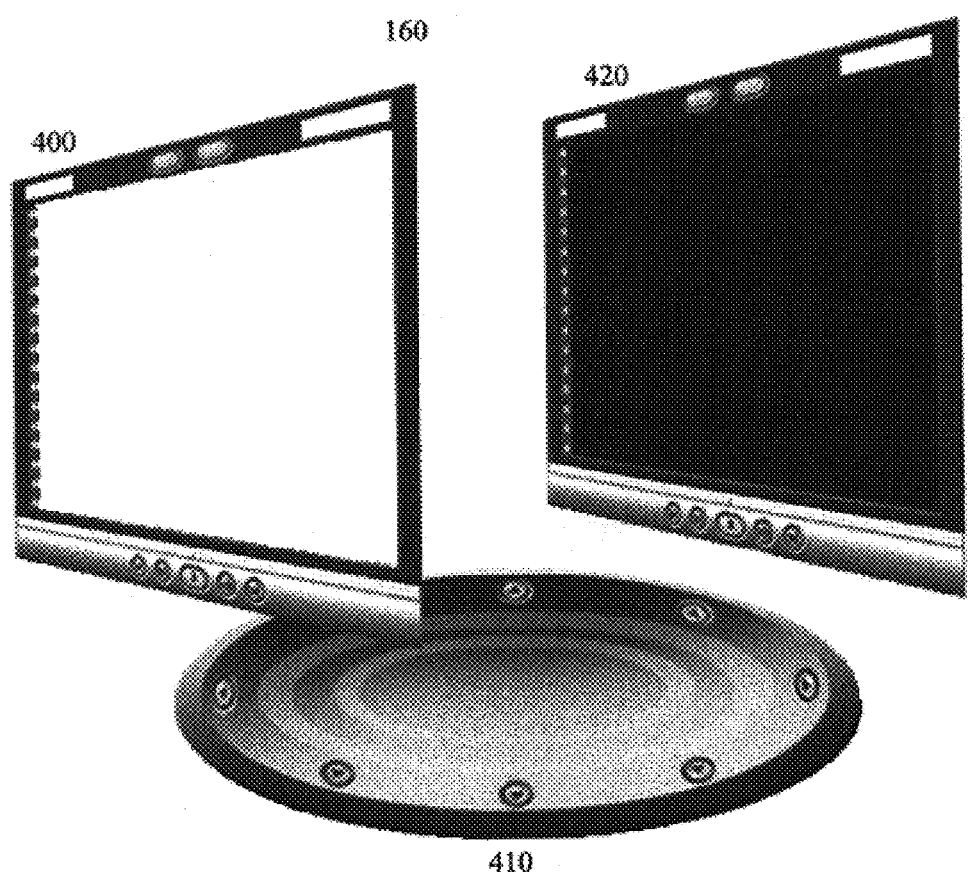
FIG. 4 is a detailed illustration of the Visual Three-Dimensional Integration Interface according to a preferred embodiment of the present invention.

The synchronization between animation and video is achieved by placing the animation timeline control within the video timeline control. The video timeline control places a set of limitations on the infinite time, size dimensions, and characteristics of the animated objects as found in a dedicated animation environment. In this way the parameters of the animated objects are "locked" to those parameters present within the limitations of the video sequence being previewed and are placed in parallel to the animation sequence being synchronized. Application 100 also includes a Visual Three-Dimensional Integration Interface 160. Integration Interface 160 is a unified work environment which enables the user to visually interact with the sound, animation and video elements. Visual Three-Dimensional Integration Interface 160 enables displaying the imported digital content in a visual three-dimensional environment that enables the manipulation of the timeline content and the previewing of the output in its final two-dimensional form. Integration Interface 160 is used to visually align the different elements together into one cohesive shot, it creates a dynamic bridge between the timeline and three-dimensional display modes, forming a hybrid of temporal and non temporal environments through which manipulation and fine tuning of content objects is performed. FIG. 4 is an illustration of Visual Three-Dimensional Integration Interface 160 in greater details. Visual Three-Dimensional Integration Interface 160 includes video surface layer 420, animation view platform 410 and consolidation layer 400. Consolidation layer 400 is positioned in the forefront of animation view platform 410 and video surface 420 is positioned behind animation view platform 410. These two frames, that of consolidation layer 400 and of video surface layer 420 are locked together and are manipulated via a scale control that can either increase or decrease the size of the two objects (zoom-in and zoom-out) and change their relative positioning.

The space between these two frames, consolidation frame 400 at the front and video frame 420 at the back, constitutes the animation view platform 410. Thus, a limitation is placed on the size of the animated objects and their time characteristics so that they fit and match the video sequence being synchronized. The two frames 400, 420 are then lined up with each other—the space between them forming view platform 410. The animated objects are placed in view platform 410 and are aligned between frames 400, 420.

Figure 5:
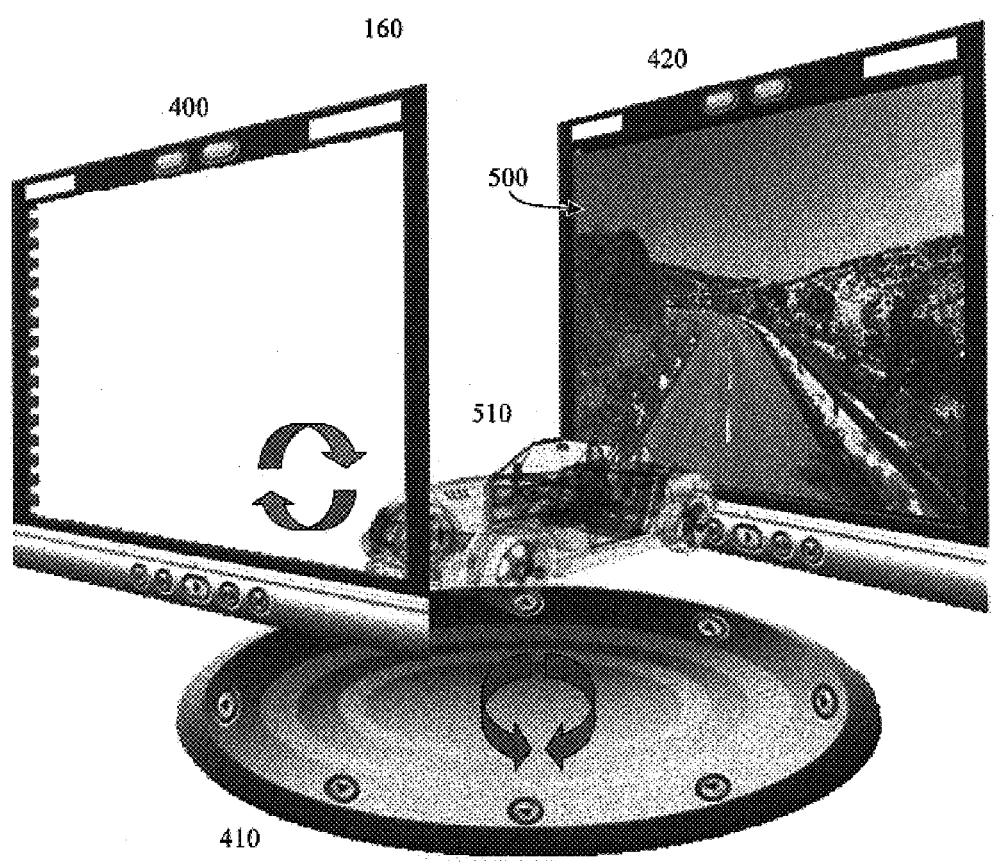
FIG. 5 is an illustration of an example for the operation of the Visual Three-Dimensional Integration Interface according to a preferred embodiment of the present invention.
Figure 6A:
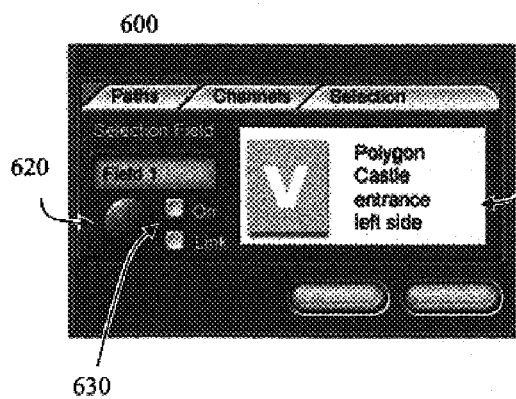
FIG. 6a is an illustration of the three-dimensional object panel according to a preferred embodiment of the present invention.
Figure 6B:
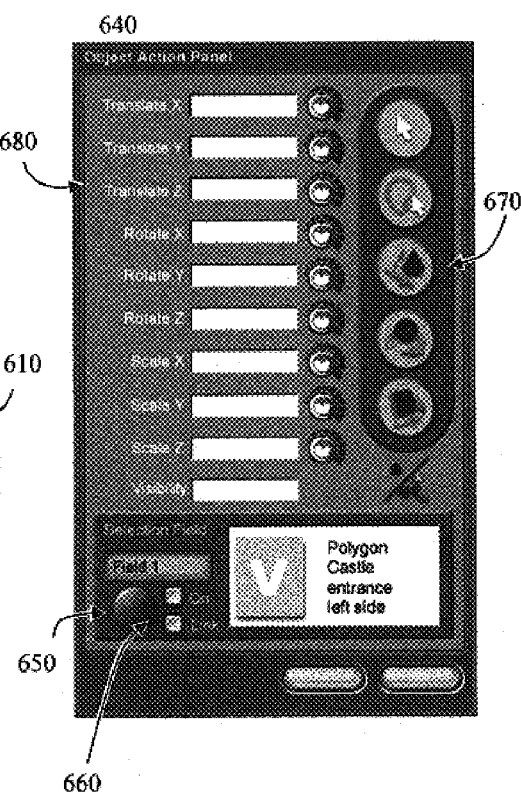
FIG. 6b is an illustration of the three-dimensional action panel according to a preferred embodiment of the present invention.

FIG. 5 is an illustration of an example for the operation of Integration Interface 160. The two-dimensional video image 500 is displayed on video surface layer 420. An animated object 510, which is a car in this instance, is in animation view platform 410. FIG. 6a is an illustration of a three-dimensional object panel. Object panel 600 includes field selector 620, for toggling between the three-dimensional animated fields, and a field information screen 610 which displays the name and details of the selected field. In addition the On and Link buttons 630 enable and link between different three-dimensional objects in the same scene. FIG. 6b is an illustration of a three-dimensional action panel. In addition to including a field selector 650 and the On and Link buttons 660, the Three-dimensional action panel 640 includes an action tools selector 670 and three-dimensional object action controls 680. Using object panel 600 and action panel 640 the parameters of the three-dimensional object 510 and its movement may be manipulated by the user in relation to image 510 on video surface layer 420. The final view of object 510 in the video image 500 may be viewed on consolidation frame 400 as illustrated in FIG. 7. Two-dimensional image 700 of three-dimensional object 510 is positioned inside video image 510 on consolidation frame 400.

Also in the scope of the present invention is a resolution control. The resolution control limits the video preview output by utilizing an adjustable dynamic control that increases or decreases the video resolution and the frames per second displayed while working in the three-dimensional mode. Reducing the level of the resolution control provides a parallel decrease in the amount of memory required by the work station. The presentation of the animated objects is also limited by the use of shade controls. The shade control provides the user several shade options that define the amount of detail used in presenting the animated object. The user simply selects from a list of shading options, e.g. wire frame, smooth shade, bounding box or high quality render. Thus when manipulating and viewing an active sequence of animation amalgamated with video in Visual Three-Dimensional Integration Interface 160, the video resolution coupled with the level of shading can be limited to reduce the amount of required computer resources.

Since both the video and animation which are viewed and manipulated in Visual Three-Dimensional Integration Interface 160 are not at full resolution, but rather are mirrored representations of root files stored on the hard drive, they must be locked and rendered so that they can be viewed as a two-dimensional video sequence. To render the final output the video output parameters and the animation output parameters are set to the required output and the video and animation are rendered into a two-dimensional video sequence. Referring back to FIG. 1, the rendering procedure produces the two-dimensional video output 180, which can then be viewed on output consol 155. Since all manipulation, visualization and assessment of the objects is performed, viewed and judged within the Integration Interface 160 then rendering need only be conducted once before final output is achieved. The software application includes a unified render which produces a unified and synchronized video output according to industry standards such as PAL, NTSC, 16:9 (Wide screen), HDTV standards and the like.

Figure 8:
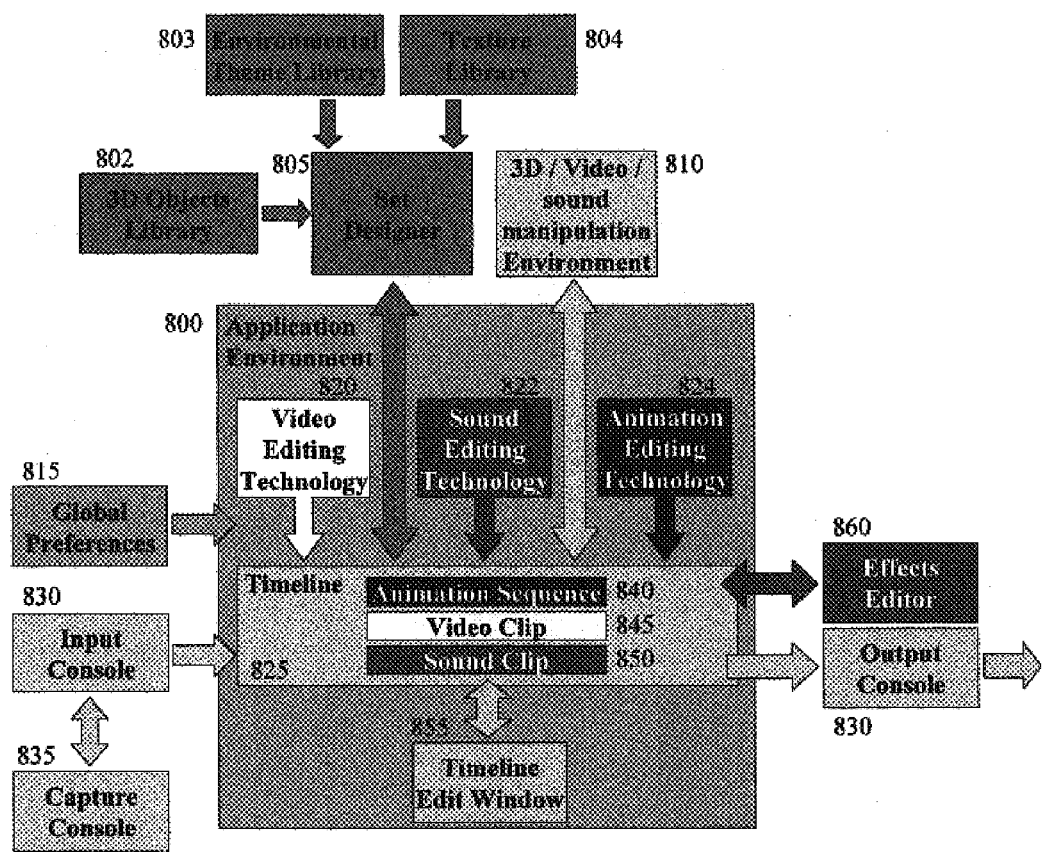
FIG. 8 is a block diagram illustrating the principle components of the present invention according to a preferred embodiment.

FIG. 8 is a block diagram illustrating the principle components of the present invention. Software application environment 800 receives inputs from Set Designer tools 805, which in turn operate based on three dimensional animation libraries—Three-Dimensional Object Library 802, Environmental Theme Library 803 and Texture Library 804. In addition, data from the sound, animation and video manipulation tools 810 is imported to software application environment 800. Additional data may be imported from Capture Consol 835 through Import Consol 830. Software application environment 800 may also receive data from external Global Preferences file 815.

Software application environment 800 includes three types of editing technologies: video 820, sound 822 and animation 824. The imported and manipulated animation sequence 840, video clip 845 and sound clip 850 are positioned on a single unified Timeline 825, and Timeline Edit Window 855 enables the relative adjustments and manipulation. Additional manipulations may be added by Effect Editor 860. The final results may be viewed on Output Consol 830.

While the above description contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A system for integrating video, three-dimensional animation and sound file formats into a unified environment for performing manipulations on said files, said system comprising a unified visual manipulation working environment, wherein said environment comprises:
   an import module for receiving a plurality of visual content objects encoded with a respective original source format within a plurality of different media formats, wherein the plurality of visual content objects comprises at least one two-dimensional video stream and at least one three-dimensional, time varying animated object;
   a unified timeline module for combining the plurality of visual content objects in time synchronization to be played on a single timeline;
   a processing module enabling separate manipulation of at least two selected visual content objects within the plurality of visual content in a non destructive manner retaining the respective original source format characteristics of each of the visual content objects; and
   a Visual Three-Dimensional Integration Interface adapted to simultaneously display a combination of the plurality of visual content objects in a three-dimensional environment, the Visual Three-Dimensional Integration Interface adapted to integrate and manipulate respective timelines of at least one visual content object within the plurality of visual content objects and preview a two-dimensional representation of the combination,
   wherein said Visual Three-Dimensional Integration Interface includes:
      a two-dimensional video surface layer adapted to display the at least one two-dimensional video stream,
      a three-dimensional animation view platform adapted to display the at least one three-dimensional, time varying animated object, and
      a consolidation layer for displaying the combination,
   wherein the three-dimensional animation view platform is illustrated as a space between the consolidation layer and the video surface layer and is adapted to manipulate in three dimensions, in response to operator input, the at least one three-dimensional, time varying animated object with respect to the at least one two-dimensional, video stream simultaneously displayed on the two-dimensional video surface layer, and
   wherein frames of the consolidation layer and of the video surface layer are locked together and are manipulated via a scale control adapted to at least one of either increase and decrease a relative size of images and three-dimensional time varying objects within confines of the consolidation layer and the two-dimensional video surface layer as compared to one another, and change a relative positioning of images and three-dimensional, time varying objects displayed in the consolidation layer and the two-dimensional video surface layer as compared to one another, the images and three-dimensional, time varying object comprising three-dimensional animation objects sitting on the three-dimensional animation platform and at least one two-dimensional video stream sitting on the two-dimensional video surface layer.

2. The system of claim 1 wherein the processing module enables manipulation of the at least two selected visual content object with full retention and control of all variable parameters associated with a respective original source format of the at least two selected visual content object.

3. The system of claim 1 further comprising a captured input window which includes a viewing screen, an input format configuration panel and controls.

4. The system of claim 1 wherein the manipulation comprises adjusting sound, video, video-animation and three-dimensional animation parameters of the at least two selected visual content object by opening a file containing the at least two selected visual content objects on said single timeline from within a framework constraint associated with the at least two selected visual content objects.

5. The system of claim 1,
   wherein the time synchronization between a selected three-dimensional, time varying animated object and a selected two-dimensional video stream is achieved by placing an animation timeline control for the selected three-dimensional, time varying animated object within a video timeline control of the selected two-dimensional, video stream,
   wherein the video timeline control places a set of limitations on the selceted three-dimensional, time varying animated object, said limitations restricting a size of the selected three-dimensional time varying animated objects and at least one time characteristic of the animated objects sequence based upon a respective timeline of the video sequence.

6. The system of claim 1 wherein the consolidation layer provides two-dimensional video output supporting the manipulation, wherein the consolidation layer is adapted to enable visualization and assessment of at least a portion of the plurality of visual content, the consolidation layer preparing the combination of the plurality of visual content objects so as to only require rendering once before final output.

7. The system of claim 1 further including a resolution control module adapted to control a video preview of the two-dimensional representation of the combination by the visual Three-Dimensional Integration Interface, the resolution control module operating to limit the video preview output by utilizing an adjustable dynamic control that increases or decreases at least one of a video resolution and a frames per second displayed while working in a three-dimensional mode.

8. The system of claim 1 further including a shade control module which enables defining an amount of detail used in presenting the three-dimensional animated object while working in a three-dimensional mode.

9. The system of claim 1 wherein the import module further converts each respective original source format within the plurality of different media formats into a native format.

10. The system of claim 1, further comprising a video output adapted to output the combination of the plurality of visual content objects.

11. A method for integrating video, three-dimensional animation and sound file formats into a unified environment for performing manipulations on said files, said method comprising:
   importing a plurality of visual content objects encoded with a respective original source format within a plurality of different media formats, wherein the plurality of visual content objects comprises at least one two-dimensional video stream and at least one three-dimensional, time varying animated object;
   combining the plurality of visual content objects in time synchronization to be played on a single timeline;

separately manipulating at least two selected visual content objects within the plurality of visual content in a non destructive manner retaining the respective original source format characteristics and preferences of each of the visual content obects;

simultaneously displaying a combination of the plurality of visual content objects in a three-dimensional environment;

integrating and manipulating respective timelines of at least one visual content object within the plurality of visual content obects; and previewing a two-dimensional representation of the combination, wherein the simultaneously displaying comprises:
- displaying the at least one two-dimensional video stream on a video surface layer,
- displaying the at least one three-dimensional, time varying animated object on a three-dimensional animation view platform, and
- displaying the combination on a consolidation layer for displaying the combination, wherein the three-dimensional animation view platform is illustrated as a space between the consolidation layer and the video surface and is adapted to manipulate in three dimensions, in response to operator input, the at least one three-dimensional, time varying animated object with respect to the at least one two-dimensional video stream simultaneously displayed on the two-dimensional video surface layer, and wherein frames of the consolidation layer and of the video surface layer are locked together and are manipulated via a scale control adapted to at least one of either increase and decrease a relative size of images and three-dimensional, time varying objects within confines of the consolidation layer and the two-dimensional video surface layer as compared to one another, and change a relative positioning of images and three-dimensional, time varying objects displayed in the consolidation layer and the two-dimensional video surface layer as compared to one another, the images and three-dimensional, time varying object comprising three-dimensional animation objects sitting on the three-dimensional animation platform and at least one two-dimensional video stream sitting on the two-dimensional video surface layer.

12. The method of claim 11 wherein the separately manipulating of the at least two selected visual content objects enables full retention and control of all variable parameters associated with a respective original source format of the selected visual content objects.

13. The method of claim 11 wherein the separately manipulating of the at least two selected visual content objects enables adjusting sound, video, video-animation and three-dimensional animation parameters of the at least two selected visual content objects by opening a file containing the at least two selected visual content objects on said single timeline from within a framework constraint associated with the at least two selected visual content objects.

14. The method of claim 11 wherein the combining in time synchronization achieves time synchronization between a selected three-dimensional, time varying animated object and a selected two-dimensional video stream by placing an animation timeline control for the selected three-dimensional, time varying animated object within the video timeline control of the selected two-dimensional video stream,
- wherein the video timeline control laces a set of limitations on the selected three-dimensional, time varying animated object, said limitations restricting a size of the selected three-dimensional, time varying animated objects and at least one time characteristic of the animated objects based upon a respective timeline of said video sequence.

15. The method of claim 11 further including limiting the video preview output by utilizing an adjustable dynamic control that increases or decreases at least one of a video resolution and a frames per second displayed while working in a three-dimensional mode.

16. The method of claim 11 further including defining an amount of detail used in presenting the three-dimensional animated object while working in the three-dimensional mode.

17. The method of claim 11 wherein the importing further comprises converting each respective original source format within the plurality of different media formats into a native format while retaining original parameters of the original source format.

18. The method of claim 11, further outputting the combination of the plurality of visual content objects.

* * * * *